US008611832B2

(12) United States Patent
Kazmi et al.

(10) Patent No.: US 8,611,832 B2
(45) Date of Patent: Dec. 17, 2013

(54) METHOD AND ARRANGEMENT FOR SELECTING AN ANTENNA MODE IN A MOBILE TELECOMMUNICATION NETWORK (75) Inventors: Muhammad Ali Kazmi, Bromma (SE); Jingyi Liao, Beijing (CN)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 826 days.

(21) Appl. No.: 12/520,204

(22) PCT Filed: Dec. 20, 2006

(86) PCT No.: PCT/SE2006/050601
§ 371 (c)(1),
(2), (4) Date: Jun. 19, 2009

(87) PCT Pub. No.: WO2008/076024
PCT Pub. Date: Jun. 26, 2008

(65) Prior Publication Data
US 2010/0093385 A1    Apr. 15, 2010

(51) Int. Cl.
*H03C 7/02* (2006.01)
(52) U.S. Cl.
USPC .......................................... 455/101; 455/574
(58) Field of Classification Search
USPC ......... 455/446, 447, 448, 436, 439, 574, 101, 455/423
See application file for complete search history.

(56) References Cited

U.S. PATENT DOCUMENTS

| 6,377,803 B1 | 4/2002 | Ruohonen |
| 2005/0170839 A1* | 8/2005 | Rinne et al. ................... 455/446 |
| 2006/0079221 A1 | 4/2006 | Grant et al. |

FOREIGN PATENT DOCUMENTS

| JP | 2004072624 A | 3/2004 |
| JP | 2005516427 A | 6/2005 |
| JP | 2006504335 A | 2/2006 |
| WO | 2006/004355 A1 | 1/2006 |

OTHER PUBLICATIONS

3rd Generation Partnership Project. "Interfereence-Aware MIMO Mode Adaptation." R1-060771, 3GPP TSG RAN WG1 Meeting #44bis, Mar. 27-31, 2006, Athens, Greece.
Mouly, M. et al. The GSM System for Mobile Communications. Telecom Publishing, 1992. p. 192.

* cited by examiner

*Primary Examiner* — Tu X Nguyen
(74) *Attorney, Agent, or Firm* — Coats & Bennett, P.L.L.C.

(57) ABSTRACT

The present invention relates to a method and an arrangement for a mobile telecommunication network for selecting an antenna mode to be used for communication between a radio network and a mobile terminal operating in discontinuous reception mode. The arrangement comprises a determiner configured to determine a mode list comprising antenna modes both supported by the radio network and the mobile terminal, associating means configured to associate each antenna mode in the mode list with a degree of a pre-defined performance measure, retrieving means configured to retrieve information indicating the pre-defined performance measure for the mobile terminal, and a selector configured to select an antenna mode from the mode list at least based on the retrieved information.

36 Claims, 8 Drawing Sheets

Fig. 7

METHOD AND ARRANGEMENT FOR SELECTING AN ANTENNA MODE IN A MOBILE TELECOMMUNICATION NETWORK

TECHNICAL FIELD

The present invention relates to a method and an arrangement (i.e., an apparatus) in a mobile telecommunication network. In particular, the present invention relates to a mechanism for selecting an antenna mode, e.g., a Multiple Input Multiple Output (MIMO) mode.

BACKGROUND

Evolved UMTS Terrestrial Radio Access (E-UTRA) is expected to support several advanced antenna techniques. One advanced antenna technique is referred to as multiple input multiple output (MIMO). MIMO implies that both the base station and the UE has multiple antennas. There exist a variety of MIMO modes. Currently a number of MIMO modes are being evaluated such as Per Antenna Rate Control (PARC), selective PARC (S-PARC), transmit diversity, receiver diversity, D-TxAA (Double Transmit Antenna Array, an advanced version of Tx diversity).

The above mentioned MIMO modes provides different spatial processing which has the potential to contribute significantly to improve spectral efficiency, diversity, coverage, interference mitigation, etc. Each MIMO mode has a certain benefit. For example, PARC in principle can achieve high spectral efficiency by transmitting independent symbol streams; this means in a 2×2 PARC (2 transmit and 2 receive antennas), two independent data streams containing different information can be transmitted to the user equipment. On the other hand, receiver diversity (implying two receive antennas at the UE and one transmit antenna at the base station) increases link reliability by introducing redundancy in multiple dimensions at the receiver, but do not provide the spectral efficiency as PARC. This means receiver diversity would lead to good coverage but at the expense of lower spectral efficiency compared to PARC. In particular, spatial domain link adaptation for multi-antennas utilizes switching between different MIMO modes based on monitoring short-term characteristic of the radio channel.

Provided that the channel characteristics are known, a suitable MIMO mode may be selected. The selected criteria for selecting the MIMO mode may however differ. Based on measured transmission characteristic, different methods have been proposed to be used to determine the criteria for selecting the MIMO mode. In the prior art, the MIMI mode switching is only performed during an active connection between the UE (User Equipment) and the network. It should be noted that the UE is also referred to as terminal or mobile terminal.

During traffic inactivity the User Equipment (i.e. the mobile terminal) enters into a quasi-active state generally termed as idle state and utilizes the discontinuous reception (DRX) in order to save the power consumption of the UE battery. In the DRX mode the UE only monitors the network paging requests or performs certain types of measurements periodically. Due to user's mobility it is also important that the UE remains camped on the right cell. Therefore, the UE also measures the strength and/or quality of the downlink reference signals sent by the serving and target cells and re-selects the best cell. At cell reselection, the UE autonomously selects a new cell. However the reselection process can be partly influenced by the network, since the network can broadcast certain system parameters related to measurement thresholds, cell ranking etc. The cell reselection procedure should allow the network to identify the location of the UE on cell level or at least on some registration area level comprising of several cells. Thus in idle mode the network maintains the UE context, thus allowing the network to be able to locate the UE when sending the paging request. In case a new cell is reselected, the UE sends an update message to the network indicating the identity of the new cell. In addition the UE can also specify its capability, downlink measurement of serving and target cells etc. An appropriate cell reselection procedure is critically important for preventing new call blocking.

In the existing network, the network performs MIMO mode switching during the on going session. However, in idle state or any other low activity state (e.g. low Radio Resource Control (RRC) state) the UE may change cell and within the cell it may even change location. Thus a situation may arise when the UE does not start with the best possible MIMO mode and when it's RRC state changes from idle to active. This will lead to throughput loss until the network selects the correct MIMO mode. In some scenarios the connection can also be lost if the call is started with an inappropriate MIMO mode. It would therefore be advantageous to be able to exploit the benefits of mode switching also in idle state. However, the existing systems do not support a functionality whereby the UE and the network (e.g. associated Node B or RNC) are able to keep track of the best MIMO mode in idle state.

SUMMARY

Thus, one aspect of the present invention is to provide a method and arrangements that makes it possible to select a suitable antenna mode such as a MIMO mode e.g. including beam forming (pre-coding) scheme when the UE is not involved in an ongoing session.

This may entail, for example, determining a mode list comprising antenna modes whereby the modes are supported both by the radio network and the mobile terminal. Each antenna mode is associated with a degree of a pre-defined performance measure and information indicating the pre-defined performance measure for the mobile terminal is retrieved. An antenna mode is selected from the mode list based on the retrieved information.

Thus according to a first aspect, the present invention provides an arrangement for a mobile telecommunication network for selecting an antenna mode to be used for communication between a radio network and a mobile terminal operating in discontinuous reception mode. The arrangement comprises a determiner configured to determine a mode list comprising antenna modes both supported by the radio network and the mobile terminal, associating means configured to associate each antenna mode in the mode list with a degree of a pre-defined performance measure, retrieving means configured to retrieve information indicating the pre-defined performance measure for the mobile terminal, and a selector configured to select an antenna mode from the mode list at least based on the retrieved information.

According to a second aspect of the present invention, a method for a mobile telecommunication network for selecting an antenna mode to be used for communication between a radio network and a mobile terminal operating in discontinuous reception mode is provided. The method comprises the steps of determining a mode list comprising antenna modes both supported by the radio network and the mobile terminal, associating each antenna mode in the mode list with a degree of a pre-defined performance measure, retrieving information indicating the pre-defined performance measure for the mobile terminal, and selecting an antenna mode from the mode list at least based on the retrieved information.

An advantage with the present invention is that it makes it possible to exploit the benefit of mode selection in idle mode. I.e. it is possible to ensure that the UE operates in appropriate mode in low activity states (DRX mode) in order to be able to correctly decode paging requests and initiate new calls. Hence, the UE is able to directly enter the best mode when the UE returns to the active state from the idle state.

A further advantage is that an embodiment of the present invention reduces call setup delay by utilizing mode switching instead of cell change in some scenarios. The embodiment makes it also possible to avoid frequent handover by replacing handover with mode selection based on the mode list, thereby prevent ping pong effect due to handovers.

DETAILED DESCRIPTION

The present invention is adapted to be used for the UE and the network (e.g. associated Node B or radio network controller) to keep track of the best antenna mode even when UE is in idle state. This mechanism may also avoid unnecessary handover or cell change. Since UE can track its best mode during idle state it is easier for UE to go directly into its best mode when the UE returns to the active state from idle state.

The basic idea of the present invention is to create an antenna mode list, also referred to as a mode list comprising the antenna modes that are supported by both the mobile terminal and the network. The antenna mode list is proposed to be used when selecting a suitable antenna mode in different scenarios such as low activity RRC states, call setup and at handovers when the UE is in idle mode and when no UE measurement reports are available.

Thus the mode list comprises all the potential modes that can be jointly supported by the mobile terminal and the corresponding access node, e.g. Node B. One mode list is created for each mobile terminal by the corresponding Node B or aGW (access gateway)/RNC (Radio Network Controller) depending upon the network architecture. The following notation is used in this description: Let $V_{ML\_s}$ be the mode list for user i, i.e. modes supported by the i:th UE and the serving Node B and the $V_{UE}$ denotes the modes supported by the UE and $V_{NodeB}$ denotes the nodes supported by the serving Node B. Then $V_{ML\_s} = V_{UE} \cap V_{NodeB} = [\alpha_1, \alpha_2, \ldots, \alpha_M]$, where, $\alpha_1$ is the MIMO mode identity.

According to the present invention, the antenna mode is selected from the list whereby the selection is based on a pre-defined performance measure. Examples of the pre-defined performance measure are capacity, coverage, peak bit rate, mean user bit rate, path loss etc. Capacity and coverage criteria are generally overall system performance measures, whereas user bit rate is user specific performance measure. On the other hand, measures like cell edge bit rate (e.g. 10th percentile) and peak bit rate (90th percentile) don't provide very good picture of the overall system and are therefore mainly specific to user performance. In packet oriented system the capacity criteria can be based on average throughout (or average bit rate) per cell. Similarly the coverage can be expressed in terms of the bit rate of x % worst users in the cell, e.g. 10% worst users or 10th percentile. The x % worst users will be located in the outskirts (cell border region) of the cell. The peak rate criteria can be based on y % best users in the cell. E.g., the $5^{th}$ percentile user throughput at cell edge versus served traffic load (average cell throughput) may be used to evaluate the system performance at the cell edge. Further a higher $5^{th}$ percentile user throughput at cell edge may correspond to a higher cell-edge data rate. The average user throughput and the $5^{th}$ percentile user throughput may be used to illustrate the system capacity and coverage. Each of the antenna modes in the mode list is associated with a degree of the pre-defined performance measure. Hence the antenna mode list is also referred to as criteria based mode list, where the criteria is the performance measure. Information indicating the pre-defined performance measure for the mobile terminal is retrieved and an antenna mode from the mode list at least based on the retrieved information.

Figure 1A:
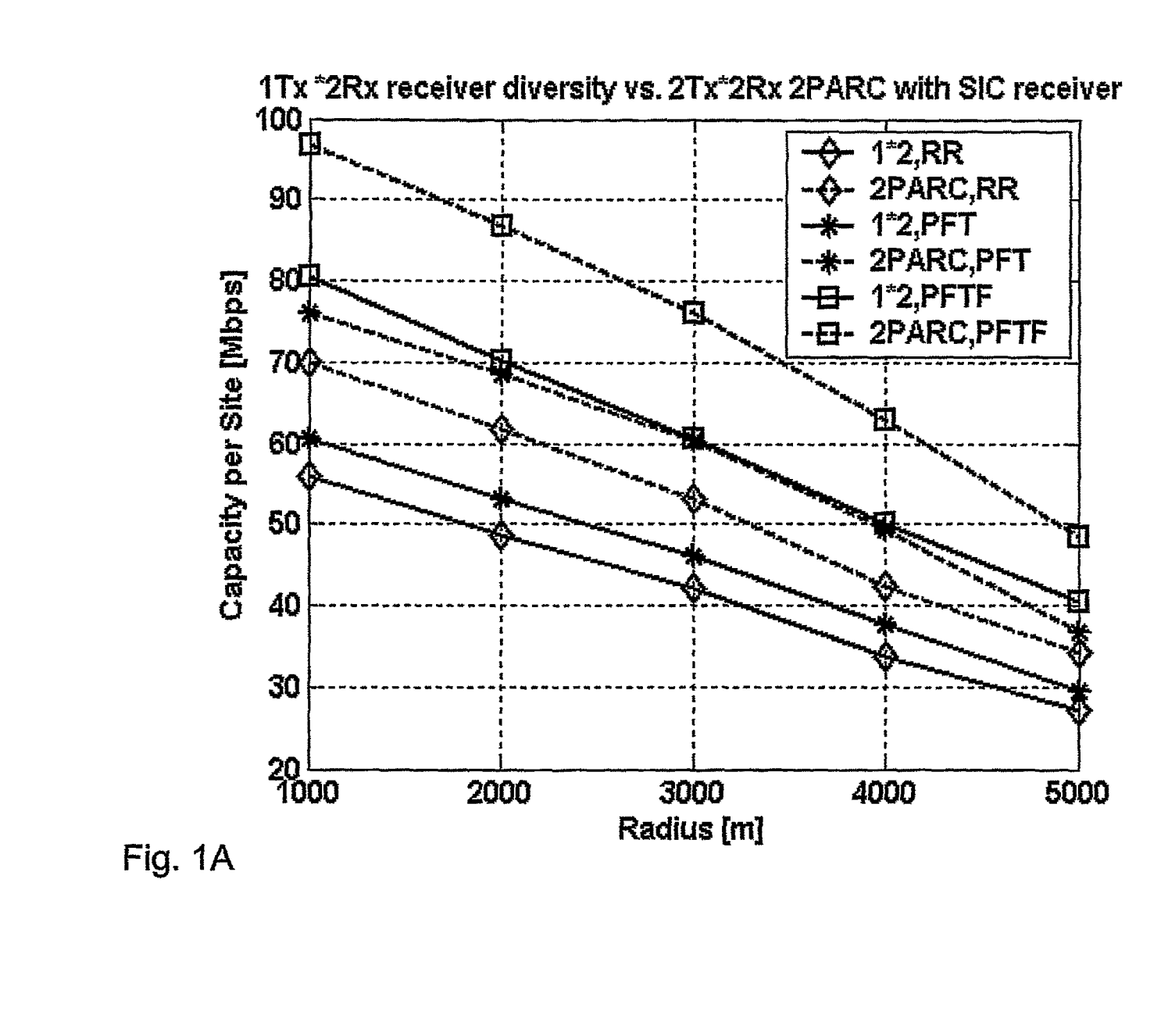
FIG. 1A is a graph illustrating capacity comparison of some MIMO modes.
Figure 1B:
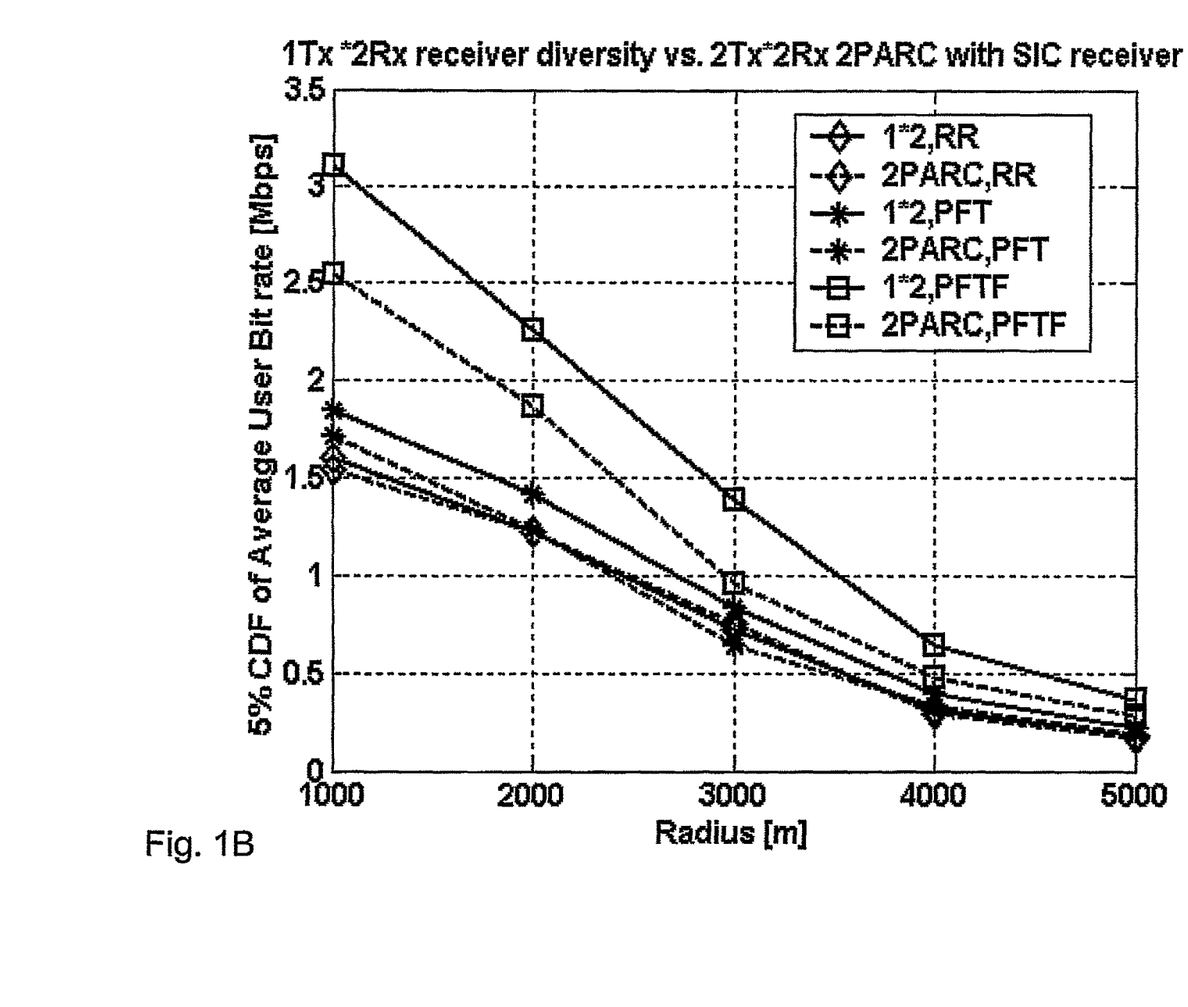
FIG. 1B is a graph illustrating coverage comparison of some MIMO modes.

FIGS. 1A and 1B illustrate the performance comparison of different antenna modes in terms of capacity and coverage, respectively. More specifically the results compare the performance of receiver diversity (1×2) with that of 2×2 per antenna rate control (PARC) scheme for different types of scheduling algorithms including round robin (RR) and variants of proportionally fair PFT (Proportionally Fair in Time domain) and PFTF (Proportionally Fair in Time Frequency domain). FIG. 1A depicts that irrespective of the scheduling policy, 2×2 per antenna rate control (PARC) scheme outperforms receiver diversity (1×2) in terms of capacity. On the other hand, FIG. 1B depicts that irrespective of the scheduling policy, receiver diversity (1×2) is superior to PARC (2×2) in terms of coverage.

Figure 2:
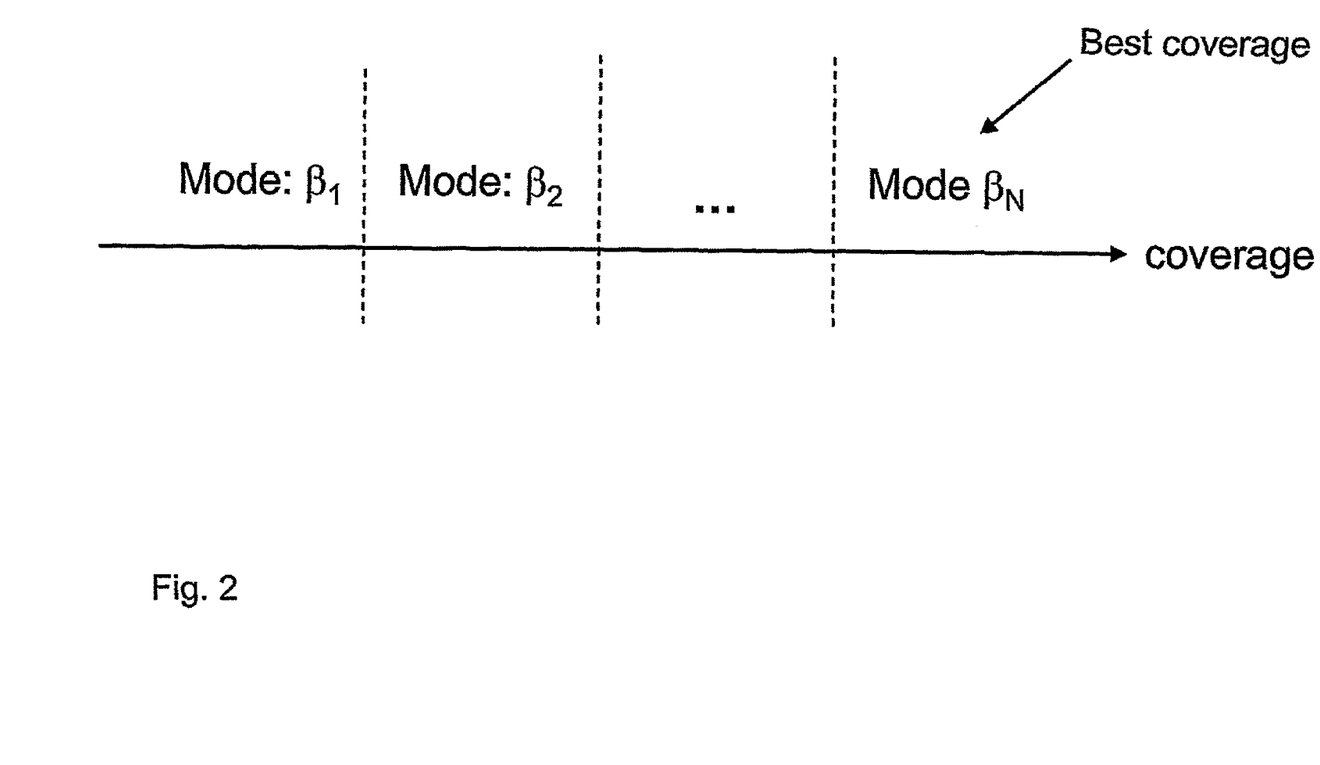
FIG. 2 illustrates schematically a coverage based mode list.

As an example, FIG. 2 depicts the principle of creating a mode list based on the performance measure coverage. In total there are N available MIMO modes, which are common to both UE and the serving base station. In order to create the criteria based mode list the available N modes needs to be sorted in the decreasing order of coverage. The FIG. 2 shows the available modes ranging from $\beta_1$ to $\beta_N$ where $\beta_N$ is the most suited for the highest coverage. Hence, coverage based ML ($V_{ML\_cov}$) is the sorted list of modes in the order to increasing coverage, i.e. $V_{ML\_cov} = [\beta_1, \beta_2, \ldots, \beta_N]$. As stated before, $V_{ML\_cov}$ set should be jointly supported by the UE and the corresponding Node B.

The coverage based mode list can thus be used to switch to mode $\beta_N$ when the UE is located close to the cell border in order to increase coverage to improve the conditions for the UE.

Similarly other criteria such as capacity can be used to create a corresponding mode list. In that case the N available modes shall be sorted according to the desired criteria. For instance in case of a peak bit rate based mode list, the first mode shall be the one that provides the maximum peak bit rate to the users. In case there is a mode that cannot fulfill the desired criteria at all that mode can be excluded from the mode list.

The main advantage of this approach is that it allows the network to fulfill the demand of user. This means a user desiring high bit rate can be served (i.e. mode switching) according to the capacity based mode list. This means after reaching the lowest mode in the capacity based mode list, the network has to do handover to make sure that UE is able to achieve the desired data rate (i.e. maintain high data rate).

The criteria based mode list may be created and maintained by the network element e.g. the Node B, the access Gateway or the Radio Network Controller that performs the mode switching. Thus depending upon the architecture, the criteria based mode list shall be created by the Node B or RNC/aGW depending upon the radio access network architecture as described below.

It should also be noted that the mode list of the present invention may be created and maintained in the UE.

Figure 3:
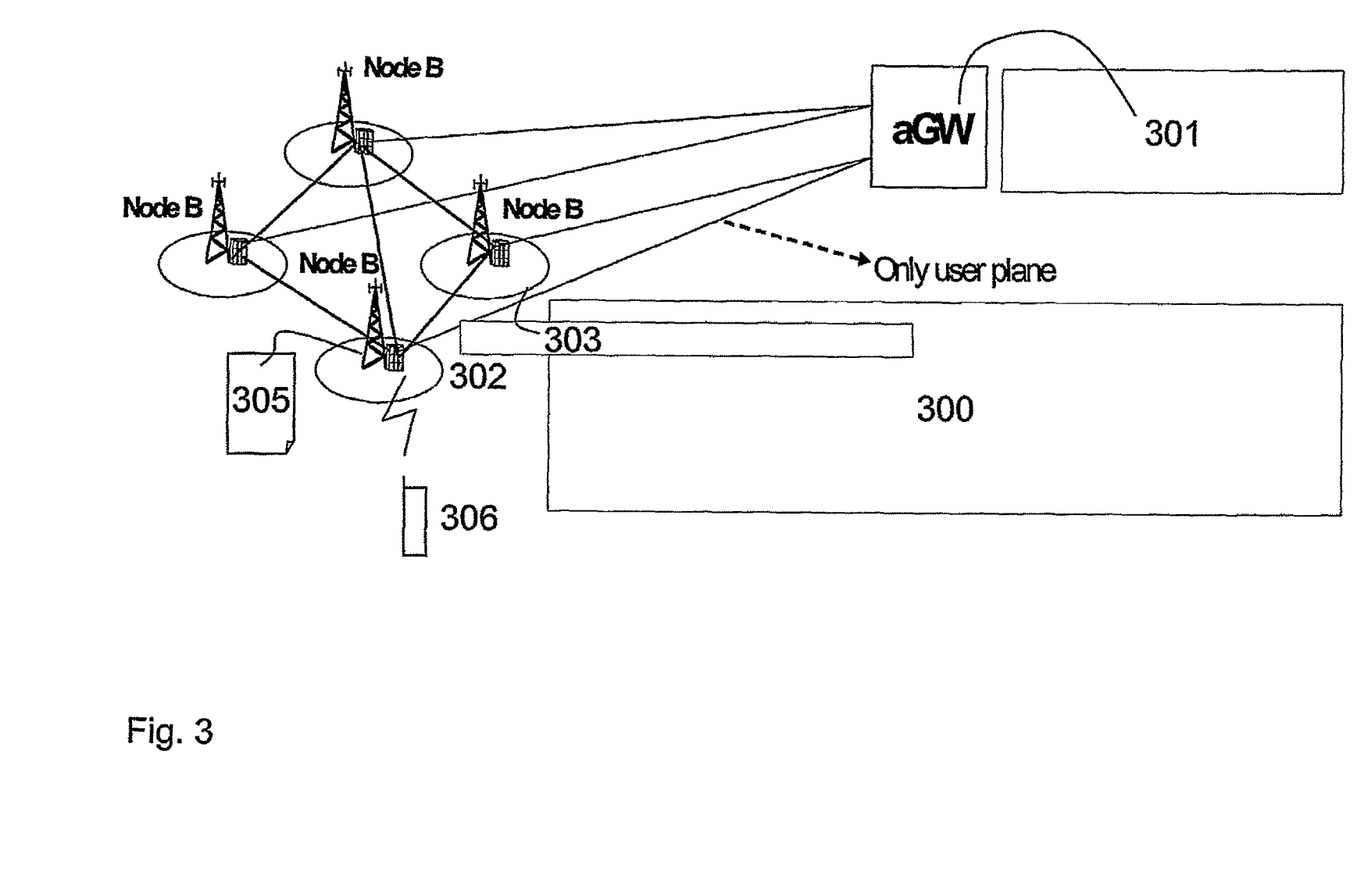
FIG. 3 illustrates a distributed Radio Access Network (RAN) architecture wherein the present invention may be implemented in the serving Node B of the distributed RAN.

FIG. 3 shows a first network 300 wherein the present invention may be implemented. The first network 300 has a distributed RAN architecture, where the access gateway (aGW) 301 performs only user plane switching. However the Node B 302-Node B 303 interface (logical links) 304 allows the exchange of radio related information. The UE 306 reports its MIMO mode capabilities to the serving Node B 302. The serving Node B 302 is configured to create the mode list 305 based on its own capabilities, UE 306 capabilities and the given criteria. Depending upon the number of criteria desired, there can be more than one criteria based mode lists built and maintained by the serving Node B 302 per UE.

In some applications it may also be advantageous that the serving Node B 302 also is configured to create and maintain a criteria based mode list corresponding to a target Node B 303 of the UE 306. I.e. the target Node B is a Node B that the UE is predicted to approach, which implies that a handover or cell re-selection to the target Node B likely will be performed. It should be noted that handover and cell reselection are in this description referred to as cell change. In that case the serving Node B is required to communicate with the target Node B over Node B-Node B interface.

Figure 4:
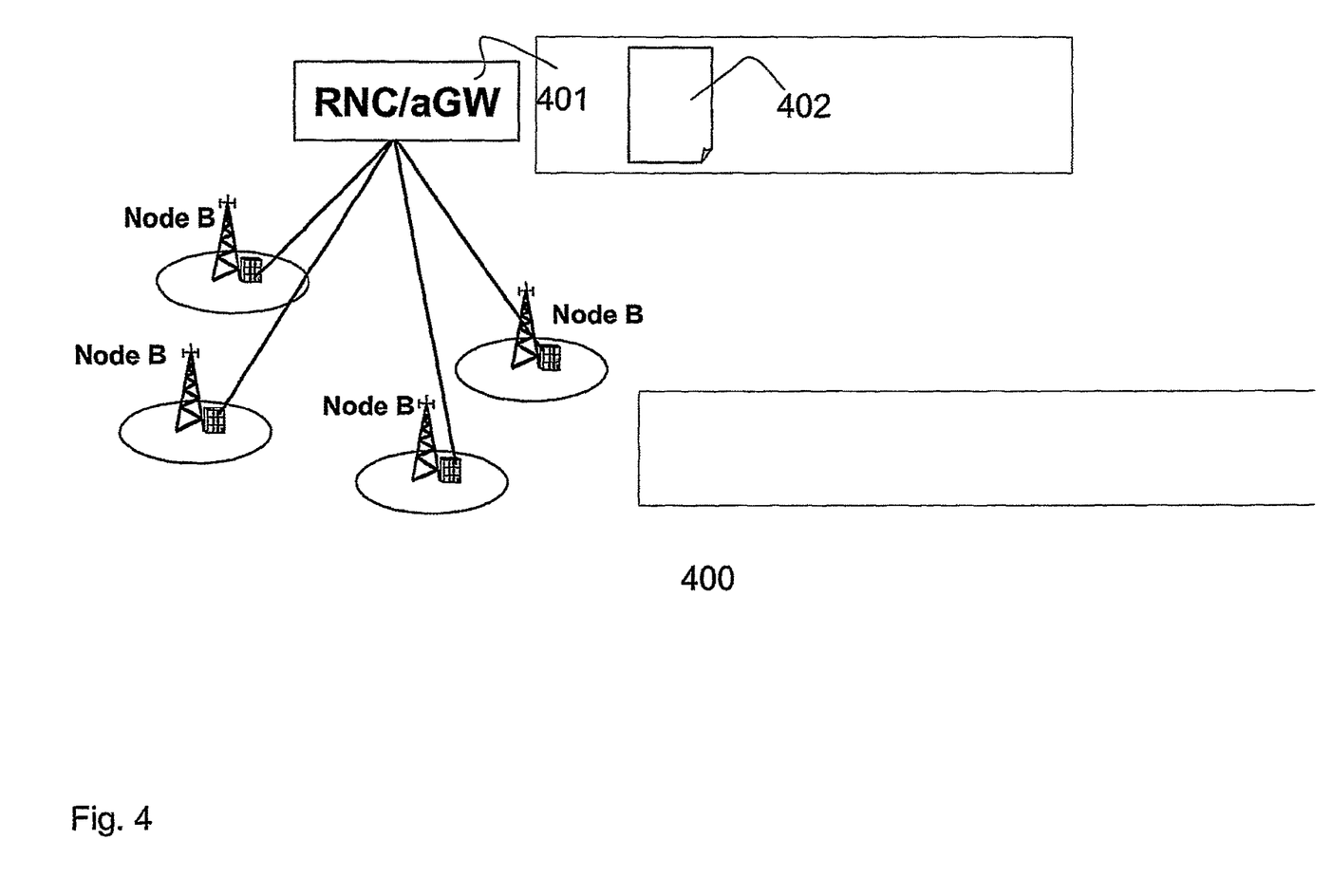
FIG. 4 illustrates a centralized Radio Access Network (RAN) architecture wherein the present invention may be implemented in a central node of the RAN such as an access gateway or a Radio Network Controller.

FIG. 4 shows a second network wherein the present invention may be implemented. The second network has a centralized RAN architecture, where the central node e.g. an access gateway (aGW) or a Radio Network Controller (RNC) is configured to receive and process the radio related information. In this case the central node is configured to manage the criteria based mode list since it is aware of UE and Node B capabilities and the central node is also adapted to decide the suitable criteria.

The multi-mode switching function in the network uses the criteria based mode list to select the mode appropriate for the given scenario. The criteria based mode list can also be used in conjunction with UE reported measurements (performed during wakeup intervals) to select a suitable mode. However, as stated above, UE measurements are not always available. In that case, the network will for mode switching rely either on its own measurements, which are done by the base station in the uplink on the received signal from the UE (exemplify!) or purely on the mode list in order to select an appropriate antenna mode.

Antenna mode switching in low activity RRC states and antenna mode switching during a call set up are discussed below.

To perform antenna mode switching during a low activity RRC states implies that no UE measurement reports may be available. By low activity it is in this description referred to when the UE operates in discontinuous reception (DRX) mode. In UTRA this occurs when UE is in idle state, cell_PCH state or URA PCH state. The states are further described in 3GPP TS 25.304, "User Equipment (UE) procedures in idle mode and procedures for cell reselection in connected mode". As agreed for E-UTRA the UE can also operate in DRX mode when in RRC connected mode in addition to the existing idle mode as described in 3GPP TS 25.813, "Evolved Universal Terrestrial Radio Access (E-UTRA) and Evolved Universal Terrestrial Radio Access Network (E-UTRAN); Radio interface protocol aspects". The aim of having DRX mode when in connected state is to save the UE battery consumption and at the same time the UE can remain synchronized with the network. This is particularly useful in the packet oriented system where there can be inactivity periods between subsequent packets within the same session. Hence in this scenario it is not desirable to terminate the session and go into the idle state if no packets are received for short time.

Figure 5:
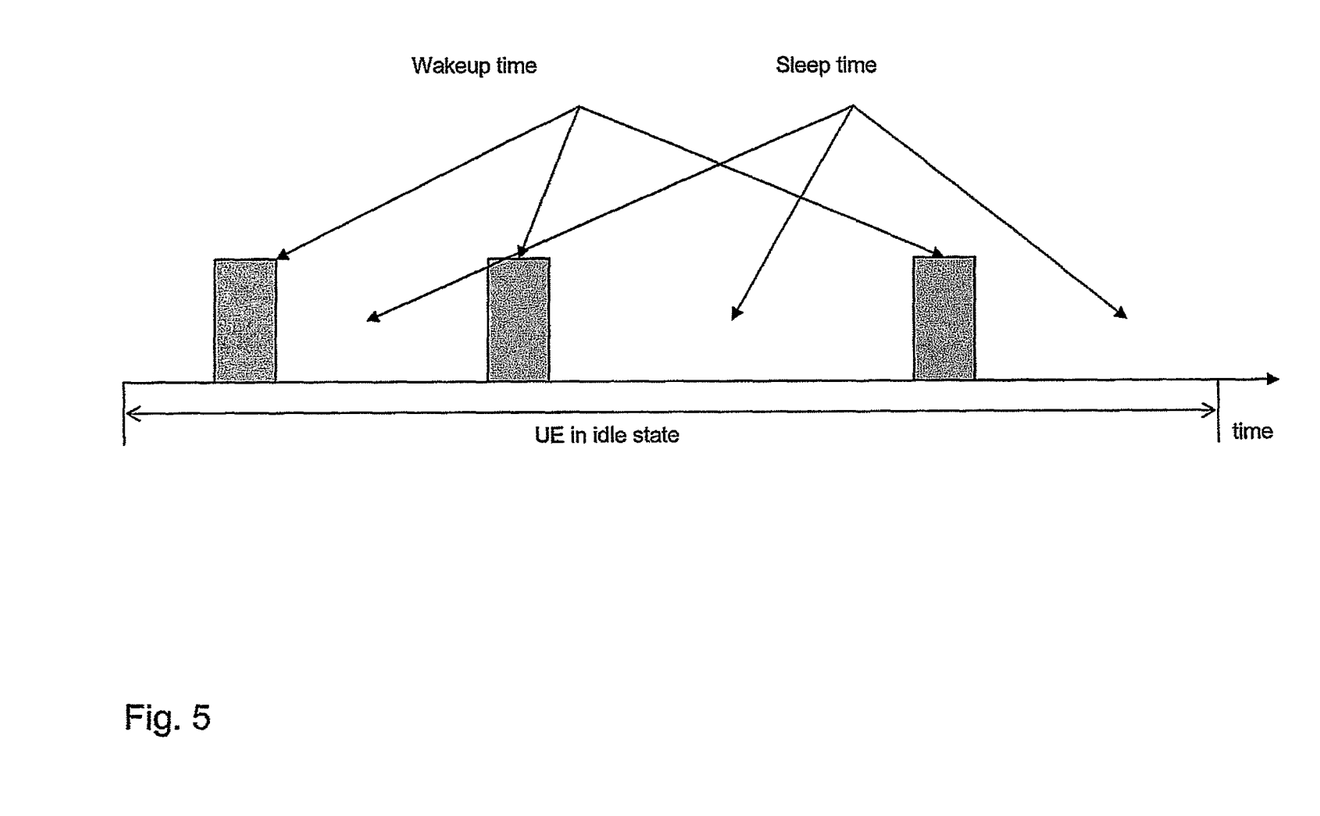
FIG. 5 illustrates how the UE listens according to the DRX cycle in idle state.

In low RRC activity states the network alone cannot keep track of the UE location in the network. Therefore, irrespective of the access technology the UE in low activity state carries out cell update (in UTRA) or tracking area update (in E-UTRA) whenever it reselects a new cell or has entered in a new location area. As shown in FIG. 5 by using DRX the UE only listens to the network (paging, broadcast etc) at certain predefined times, termed as the wakeup time in this description.

Either network or UE can select the most appropriate mode from the criteria based mode list whenever necessary for example when the UE coverage is becoming worse. In the network this can be done when it receives a UE update message (cell update, tracking area update etc) from the UE. On the UE side this can be done based on UE measurements, which are done in DRX mode (i.e. discontinuous reception mode). The UE listens to the network only at the wakeup instances but it can still perform measurements in between the wakeup instances (especially if DRX cycle length is long, e.g. 2-5 seconds) to get sufficient measurement samples. But generally the measurements performed in DRX mode are less accurate compared to those in the connected mode since the former would contain fewer measurement samples. The following rules may be used during network based mode selection without UE measurement reports. Network based mode selection implies that e.g. the Node B, aGW or RNC depending on the network architecture as discussed above performs the antenna mode selection:

If the UE does not report measurements in the update message during its wakeup intervals then there are following possibilities:

If the network can fully decode the UE update message then it maintains the current mode.

Situation may arise when network can decode UE identity but not the data part of the UE update message. Thus if the network cannot fully decode the UE update message then it switches to a mode improving the performance measure e.g. the coverage and requests the UE to switch to the same mode. the antenna mode is according to the present invention is selected from the criteria based mode list.

IF the network cannot fully decode the UE update message then it may also determine the uplink coverage by measuring the strength or/and quality of the UL received message and thereby select the appropriate mode from the criteria based mode list based on the measurement.

IF the network cannot fully decode the UE update message AND already operating with the highest mode, i.e. the antenna mode providing the best performance measure (ON) then network will initiate handover.

The following rules may be used during network based mode selection when UE measurement reports are available. i.e. the UE update message comprises UE measurements performed during its wakeup time.

If the network receives UE measurement reports then the network has an option to carry out the mode selection using the UE measurements. The network can also make a combined decision by considering both UE measurements and the uplink measurements done by the base station. As a special case an appropriate antenna mode selected from the mode list can be solely based on the UE measurements.

If the UE measurements indicate that an antenna mode providing a better performance measure should be selected and no antenna mode providing a better performance measure is available, then the network will initiate handover. An example, is when the UE is far out in a cell and the measurement reports indicate that coverage is bad and the current antenna mode that is being used is the antenna mode of the mode list that provides the best.

In addition to network based mode selection, the UE may also perform the mode selection which is referred to as UE based mode selection. In this case UE can perform measurements since there are always some pilot signals sent by the network.

The UE based mode selection may be used as described below.

The UE may select an appropriate mode based on the downlink measurements (performed by the UE) and/or the criteria based mode list. The downlink measurement value range will correspond to a certain best possible mode listed in the criteria based mode list. As before the criteria based mode list will be set by pre-defined rules or by negotiation between UE and the base station. As an example if the measured value is between $\alpha_1$ and $\alpha_1$ then the best mode is $\beta_1$. Hence the UE shall select the best possible mode as explained above and request the network to switch to that mode.

If the performance measure such as the coverage of the existing cell is too bad then UE selects a mode giving a better performance measure from the criteria based mode list and requests the network to switch to the corresponding mode.

If the performance measure such as the downlink coverage is too bad and the UE is already operating with the mode giving the best coverage then the UE either autonomously reselects the best cell or it requests the network to change the cell (requests handover). Autonomous cell change (or reselection) is generally done by the UE when operating in idle mode. On the other hand network controlled cell change (or handover) is used when UE is in semi-connected mode (or semi-idle mode). In semi-idle mode on the one hand UE is able to save battery since UE listens to the network only at the DRX instances. On the other hand the UE remains well synchronized with the network. In this way the UE can quickly receive data without going through the formalities of the call setup.

It should be noted that in practice either network based or UE based or hybrid (combined UE and network based) mode selection in low activity RRC state are possible.

Further, the mode switching of the present invention may also be used at call setup.

At the time of call setup the UE will enter into RRC connected or active state from an idle state. Situation can arise that at the time of call setup the UE is not camped on to the best cell thus the serving cell may not be able to provide adequate coverage using the current mode. In addition channel measurements may not be available at the call setup. Poor cell reselection can occur typically if UE is moving with a faster speed and using long DRX cycle, thereby preventing UE from doing appropriate measurements. As a consequence the UE may be far out in the cell. Admitting the UE to a new cell may lead to call setup delay and may also result in call blocking. Thus the network may use the same rules as described above in conjunction with the network based mode selection without and with UE measurement reports and the UE based mode selection.

In addition, an embodiment of the present invention allows trade-off between mode switching and change in idle mode. I.e. a cell change may be avoided by changing to an antenna mode giving a better performance measure. E.g. if the UE is far out in the cell, an antenna mode providing a better coverage may be selected instead of performing a ell reselection to another cell.

Handover in idle mode is generally termed as cell reselection. Handover in general should be executed only if it is absolutely necessary. The same is true for cell reselection. Secondly, the ping pang effect arising due to too frequent handovers/cell reselection referred to as cell change should be avoided as much as possible. Thirdly, the handover may not be successfully completed due to lack of radio or other network resources in the target Node B. For these reasons, multi-mode switching can be exploited to prevent unnecessary cell changes and thereby maintaining the on going connection with an acceptable quality of service. Following rules may be used:

If only mode switching is indicated to be required (i.e. no cell change is indicated to be required) then the network performs mode switching.

If cell change is required and the current mode is $\beta_i$ (i<N), the network first attempts to switch to higher mode $\beta_j$ (j>i) (i.e. a mode giving a better performance measure) if possible, otherwise perform cell change. Then the network is configured to indicate to the UE that mode switching instead of cell-change will occur. Then, if possible, the UE may report measurements adapted to assist the mode selection.

If cell change is required and current mode is the mode ($\beta_N$) giving the best performance measure, then the network directly performs cell change.

Figure 6:
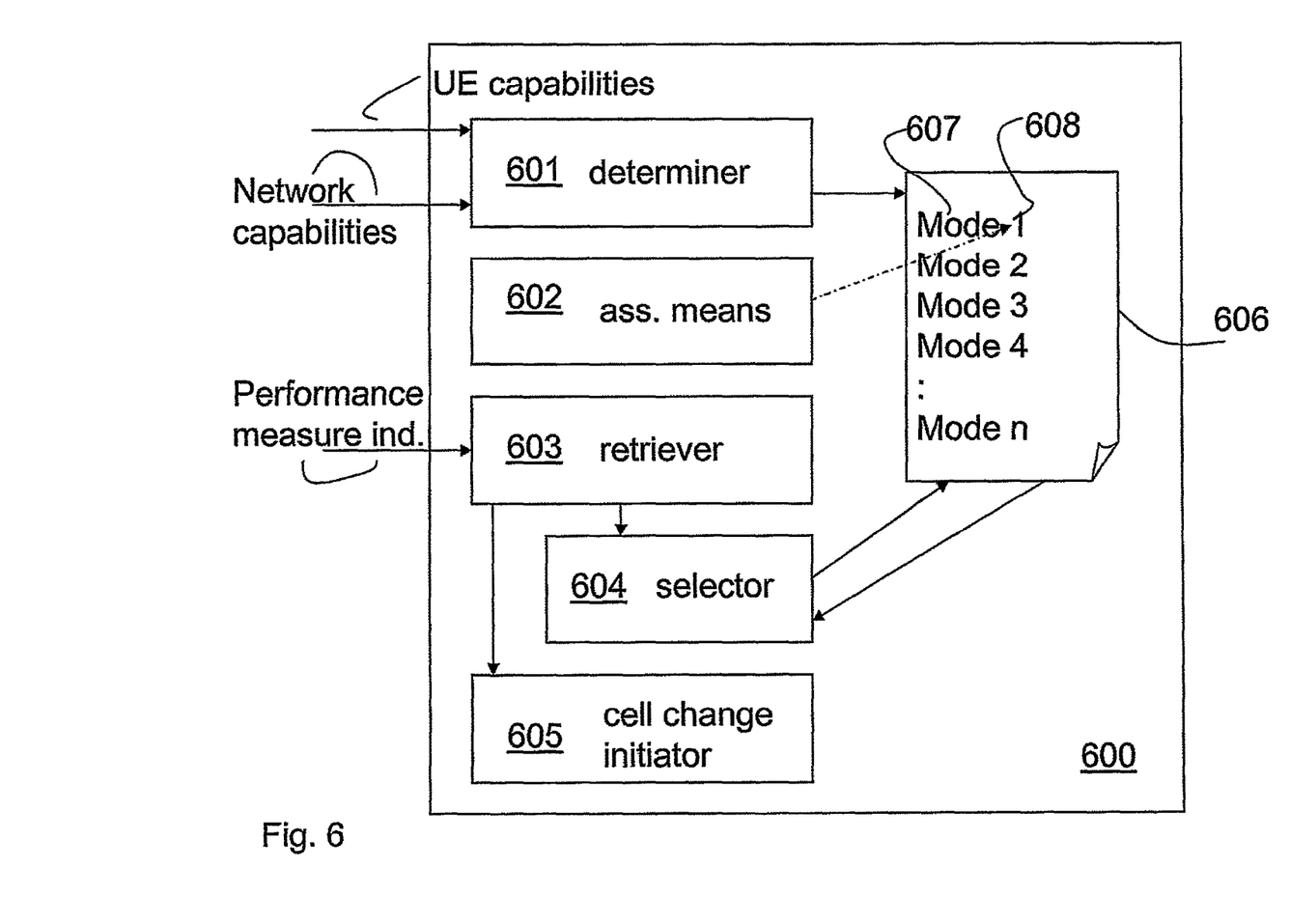
FIG. 6 illustrates the arrangement according to one embodiment.

Thus the arrangement 600 according to the invention is illustrated in FIG. 6. The arrangement 600 comprises a determiner 601 configured to determine a mode list 606 comprising antenna modes 607 both supported by the radio network and the mobile terminal, associating means 602 configured to associate each antenna mode in the mode list with a degree of a pre-defined performance measure, retrieving means 603 configured to retrieve information indicating the pre-defined performance measure for the mobile terminal, and a selector 604 configured to select an antenna mode from the mode list at least based on the retrieved information.

The arrangement may by implemented in a node in the radio network or in the UE, wherein the node may be a Node B, RNC or aGW.

When the arrangement is implemented in the network, the selector 604 may be further configured to maintain a current antenna mode when the retrieved information is information that the network is able to fully decode a received message such as a UE update message from the terminal.

Further, the selector 604 may be further configured to switch to an antenna mode from the mode list giving a higher performance measure than the current antenna mode when it is indicated that the current antenna mode does not give a performance measure that is not good enough as described above.

Moreover, the arrangement may also comprise an initiator 605 configured to initiate a cell change when the retrieved information comprises information that a higher antenna mode is required and selection to a higher mode selection is not possible.

It should also be noted that the retrieved information comprises measurement reports performed by the terminal also referred to as the UE.

Figure 7:
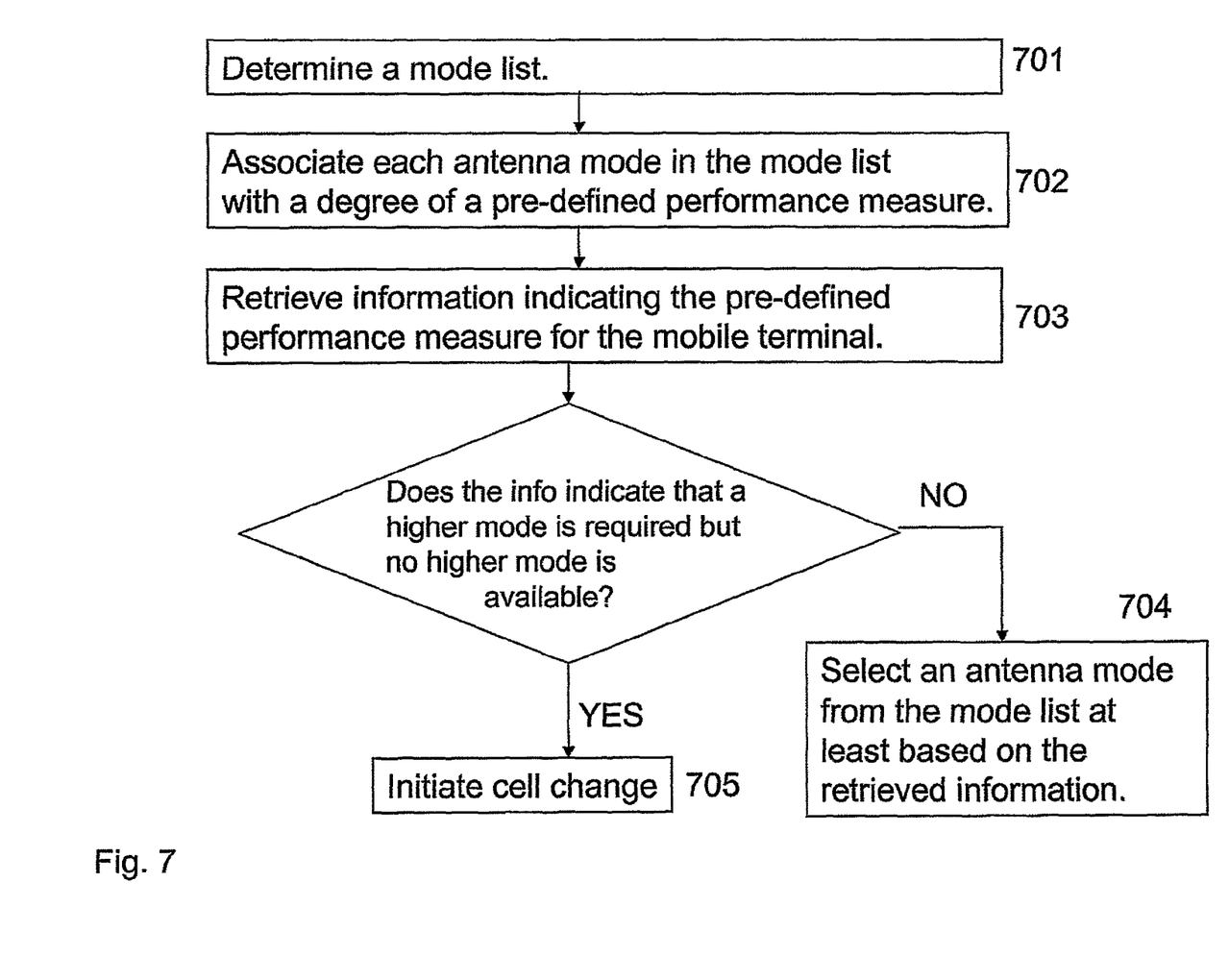
FIG. 7 is a flowchart of the method according to one embodiment.

Further, the present invention also relates to a method illustrated in a flowchart in FIG. 7.

The method comprises the steps of:

701: Determine a mode list comprising antenna modes supported by both the UE and the network.

702: Associate each antenna mode in the mode list with a degree of a pre-defined performance measure, e.g. sorting the modes in an order determined by the performance measure that the respective antenna mode provides.

703: Retrieve information indicating the pre-defined performance measure for the mobile terminal in the current situation. E.g. an information indicating the current coverage situation of the terminal.

704: Select an antenna mode from the mode list at least based on the retrieved information.

According to embodiments of the invention, the selecting step 704 is replaced by a step of initiate 705 a cell change if the retrieved information indicates that a higher mode is required but no higher mode is available, i.e. the current antenna mode is the antenna mode in the mode list that provides the best performance measure.

The invention claimed is:

1. A method implemented in a mobile telecommunication network of selecting an antenna mode to be used for communication between a radio network and a mobile terminal operating in discontinuous reception mode, comprising:
   determining a mode list comprising antenna modes that are supported by both the radio network and the mobile terminal;
   associating each antenna mode in the mode list with a degree of a pre-defined performance measure; and
   while the mobile terminal is operating in discontinuous reception mode:
      dynamically retrieving information indicating a degree of the pre-defined performance measure currently provided for the mobile terminal by a currently selected antenna mode;
      dynamically tracking which, if any, antenna mode in the mode list is associated with a degree of the pre-defined performance measure that is better than the degree indicated by the retrieved information; and
      if an antenna mode is tracked as being associated with a better degree of the pre-defined performance measure than the currently selected antenna mode, dynamically switching as needed from the currently selected antenna mode to that antenna mode.

2. The method of claim 1 further comprising, while the mobile terminal is operating in discontinuous mode:
   if a switch is needed to an antenna mode associated with a better degree of the pre-defined performance measure than the currently selected antenna mode, but no such antenna mode is available in the mode list, initiating a cell change.

3. The method of claim 1, wherein the method is implemented in a node in the radio network.

4. The method of claim 3, wherein the node is a Node B.

5. The method of claim 3 wherein the node is a Radio Network Controller or an access Gateway.

6. The method of claim 3, wherein the retrieved information does not comprise measurements performed by the mobile terminal.

7. The method of claim 3, wherein the retrieved information comprises a message received from the terminal, and wherein said dynamically switching as needed comprises:
   performing said dynamic switching if the mobile telecommunication network is not able to fully decode the received message; and
   refraining from performing said dynamic switching, so as to maintain the currently selected antenna mode, if the mobile telecommunication network is able to fully decode the received message.

8. The method of claim 7, wherein the retrieved information comprises a User Equipment (UE) update message.

9. The method of claim 3, wherein the retrieved information comprises a message received from the terminal, and wherein the method further comprises, while the mobile terminal is operating in discontinuous mode, initiating a cell change if the mobile telecommunication network cannot fully decode the received message and the terminal is operating with the antenna mode associated with the best degree of the pre-defined performance measure.

10. The method of claim 1, wherein the retrieved information comprises measurement reports performed by the terminal.

11. The method of claim 10, wherein the retrieved information comprises User Equipment (UE) reports indicating that an antenna mode is required that is associated with a higher degree of the pre-defined performance measure, and wherein the method further comprises, while the mobile terminal is operating in discontinuous mode, initiating a cell change if switching to such a required antenna mode is not possible.

12. The method of claim 1, wherein the method is implemented in the mobile terminal.

13. The method of claim 12, wherein the retrieved information comprises downlink measurements performed by the terminal.

14. The method of claim 13, wherein said dynamically switching as needed comprises performing said dynamic switching if the downlink measurements indicate that the degree of the pre-defined performance measure provided by the currently selected antenna mode is below a pre-determined threshold.

15. The method of claim 13, further comprising, while the mobile terminal is operating in discontinuous mode, initiating a cell change if the downlink measurements indicate that the degree of the pre-defined performance measure provided by the currently selected antenna mode is below a pre-determined threshold and the terminal is operating with the antenna mode associated with the best degree of the pre-defined performance measure.

16. The method of claim 1, wherein the pre-defined performance measure is a capacity measure.

17. The method of claim 1, wherein the pre-defined performance measure is a coverage measure.

18. The method of claim 1, wherein each antenna mode in the mode list comprises a Multiple Input Multiple Output (MIMO) antenna mode.

19. An apparatus in a mobile telecommunication network configured to select an antenna mode to be used for communication between a radio network and a mobile terminal operating in discontinuous reception mode, comprising:
   one or more processing circuits configured to:
      determine a mode list comprising antenna modes that are supported by both the radio network and the mobile terminal;
      associate each antenna mode in the mode list with a degree of a pre-defined performance measure;

while the mobile terminal is operating in discontinuous reception mode:
  dynamically retrieve information indicating a degree of the pre-defined performance measure currently provided for the mobile terminal by a currently selected antenna mode;
  dynamically track which, if any, antenna mode in the mode list is associated with a degree of the pre-defined performance measure that is better than the degree indicated by the retrieved information; and
  if an antenna mode is tracked as being associated with a better degree of the pre-defined performance measure than the currently selected antenna mode, dynamically switch as needed from the currently selected antenna mode to that antenna mode.

20. The apparatus of claim 19, wherein the one or more processing circuits are further configured to, while the mobile terminal is operating in discontinuous mode:
  if a switch is needed to an antenna mode associated with a better degree of the pre-defined performance measure than the currently selected antenna mode, but no such antenna mode is available in the mode list, initiate a cell change.

21. The apparatus of claim 19, wherein the apparatus comprises a node in the radio network.

22. The apparatus of claim 21, wherein the node comprises a Node B.

23. The apparatus of claim 21, wherein the node comprises a Radio Network Controller or an access Gateway.

24. The apparatus of claim 21, wherein the retrieved information comprises a message received from the mobile terminal, and wherein the one or more processing circuits are configured to perform said dynamic switching as needed by:
  performing said dynamic switching if the mobile telecommunication network is not able to fully decode the received message; and
  refraining from performing said dynamic switching, so as to maintain the currently selected antenna mode, if the mobile telecommunication network is able to fully decode the received message.

25. The apparatus of claim 24, wherein the retrieved information comprises a User Equipment (UE) update message.

26. The apparatus of claim 21, wherein the retrieved information does not comprise measurements performed by the mobile terminal.

27. The apparatus of claim 21, wherein the retrieved information comprises a message received from the mobile terminal, and wherein the one or more processing circuits are configured, while the mobile terminal is operating in discontinuous mode, to initiate a cell change if the mobile telecommunication network cannot fully decode the received message and the mobile terminal is operating with the antenna mode associated with the best degree of the pre-defined performance measure.

28. The apparatus of claim 19, wherein the retrieved information comprises measurement reports performed by the mobile terminal.

29. The apparatus of claim 28, wherein the retrieved information comprises User Equipment (UE) reports indicating that an antenna mode is required that is associated with a higher degree of the pre-defined performance measure, and wherein the one or more processing circuits are configured, while the mobile terminal is operating in discontinuous mode, to initiate a cell change if switching to such a required antenna mode is not possible.

30. The apparatus of claim 19 wherein the apparatus is implemented in the mobile terminal.

31. The apparatus of claim 30, wherein the retrieved information comprises downlink measurements performed by the mobile terminal.

32. The apparatus of claim 31, wherein the one or more processing circuits are configured to perform said dynamically switching as needed by performing said dynamic switching if the downlink measurements indicate that the degree of the pre-defined performance measure provided by the currently selected antenna mode is below a pre-determined threshold.

33. The apparatus of claim 31, wherein the one or more processing circuits are configured, while the mobile terminal is operating in discontinuous mode, to initiate a cell change when the downlink measurements indicate that the degree of the pre-defined performance measure provided by the currently selected antenna mode is below a pre-determined threshold and the terminal is operating with the antenna mode associated with the best degree of the pre-defined performance measure.

34. The apparatus of claim 19, wherein the pre-defined performance measure is a capacity measure.

35. The apparatus of claim 19, wherein the pre-defined performance measure is a coverage measure.

36. The apparatus of claim 19, wherein each antenna mode in the mode list comprises a Multiple Input Multiple Output (MIMO) antenna mode.

* * * * *